(12) United States Patent
Roschmann et al.

(10) Patent No.: US 7,612,126 B2
(45) Date of Patent: Nov. 3, 2009

(54) LOW-VOC AQUEOUS COATING COMPOSITIONS WITH EXCELLENT FREEZE-THAW STABILITY

(75) Inventors: Konrad Roschmann, Ludwigshafen-Edigheim (DE); Joerg Leuninger, Mainz (DE); Rolf Dersch, Neustadt (DE); Cheng-Le Zhao, Charlotte, NC (US); Li Zhuo, Fort Mill, SC (US); Terri A. Cunningham, Concord, NC (US)

(73) Assignee: BASF Aktiengesellschaft, Ludwigshafen (DE)

( * ) Notice: Subject to any disclaimer, the term of this patent is extended or adjusted under 35 U.S.C. 154(b) by 700 days.

(21) Appl. No.: 10/580,250

(22) PCT Filed: Dec. 1, 2004

(86) PCT No.: PCT/EP2004/013616

§ 371 (c)(1),
(2), (4) Date: May 23, 2006

(87) PCT Pub. No.: WO2005/054384

PCT Pub. Date: Jun. 16, 2005

(65) Prior Publication Data

US 2007/0105982 A1   May 10, 2007

(30) Foreign Application Priority Data

Dec. 4, 2003 (EP) .................................. 03027939
Dec. 5, 2003 (EP) .................................. 03028007

(51) Int. Cl.
*C08L 83/00* (2006.01)
(52) U.S. Cl. ..................... 523/201; 524/515; 524/523; 524/529; 524/533
(58) Field of Classification Search ................ 523/201; 524/515, 523, 529, 533
See application file for complete search history.

(56) References Cited

U.S. PATENT DOCUMENTS

| 5,296,524 | A  | * | 3/1994  | Waters ........................ 523/319 |
| 5,990,202 | A  | * | 11/1999 | Nguyen et al. ............... 523/201 |
| 6,013,324 | A  | * | 1/2000  | Frangou et al. ........... 427/388.4 |
| 6,057,384 | A  | * | 5/2000  | Nguyen et al. ............... 523/160 |
| 6,203,973 | B1 | * | 3/2001  | Chen et al. ................... 430/627 |
| 6,359,031 | B1 | * | 3/2002  | Lykke et al. ................. 523/201 |
| 6,365,647 | B1 | * | 4/2002  | Westerman .................. 523/201 |
| 6,737,449 | B1 | * | 5/2004  | Yatake ......................... 523/160 |
| 6,992,121 | B1 | * | 1/2006  | Peters et al. ................. 523/206 |

FOREIGN PATENT DOCUMENTS

| EP | 1 106 660   | 6/2001 |
| EP | 1 118 632   | 7/2001 |
| JP | 2003 251269 | 9/2003 |

OTHER PUBLICATIONS

Bosen, Sidney F, et al.,"Antifreezes", Ullmann's Encyclopedia of Industrial Chemistry, 5$^{th}$ ed., vol. A3, pp. 23-31.

* cited by examiner

*Primary Examiner*—Bernard Lipman
(74) *Attorney, Agent, or Firm*—Oblon, Spivak, McClelland, Maier & Neustadt, L.L.P.

(57) ABSTRACT

The present invention relates to an aqueous coating composition having excellent freeze-thaw stability and a low-VOC content, comprising a multi-stage polymer dispersion comprising (a) an inner phase comprising at least one latex polymer derived from at least one monomer and at least one polymerizable alkoxylated surfactant having the structure: $R^1$—$R^2$ wherein R1 is an allyl group selected from the group consisting of $CH_3$—$CH\!=\!CH$— and $CH_2\!=\!CH$—$CH_2$—, or an acrylic group and $R^2$ is a radical comprising at least two carbon atoms and at least one oxyethylene or oxypropylene unit; (b) an outer phase having a glass transition temperature of from 30° C. to 110° C. containing at least one ethylenic unsaturated monomer (c) at least one pigment; (d) water; and (e) less than 3.0% by weight based on the total weight of the aqueous coating composition of anti-freeze agents.

17 Claims, No Drawings

LOW-VOC AQUEOUS COATING COMPOSITIONS WITH EXCELLENT FREEZE-THAW STABILITY

The present invention relates to the use of surfactants for reducing the VOC content of aqueous coating compositions such as paint and paper coating compositions while still maintaining the freeze-thaw stability of these compositions. In particular, the present invention relates to the use of certain polymerizable alkoxylated surfactants in latex polymers to reduce the VOC content of aqueous paint and paper coating compositions while maintaining the freeze-thaw stability of these compositions.

Latex paints are used for a variety of applications including interior and exterior, and flat, semi-gloss and gloss applications. In order to provide latex paints with good film formation, coalescing agents are often added to these paints. Exemplary coalescing agents include 2,2,4-trimethyl-1,3-pentanediol monoisobutyrate (i.e. TEXANOL® commercially available from Eastman Chemical) and 2-ethylhexyl benzoate (i.e. VELATE® 378 commercially available from Vesicol Corporation).

In addition to coalescing agents, latex paints include anti-freeze agents to allow the paints to be used even after they have been subjected to freezing conditions. In addition, anti-freeze agents typically increase the open time for latex paints. Exemplary anti-freeze agents include ethylene glycol, diethylene glycol and propylene glycol. These anti-freeze agents are discussed in detail in "Antifreezes", Ulmann's Encyclopedia of Industrial Chemistry, 5$^{th}$ ed., vol. A3, pages 23-31.

The additives used as coalescing agents and anti-freeze agents are effective for their purposes but are becoming more and more undesirable because they are volatile organic compounds (VOC's). After application of the latex paint to a substrate, the VOC's slowly evaporate into the surroundings. As permissible VOC levels continue to decrease as a result of increased environmental regulations, there has become a need in the art to produce latex paints with lower VOC levels. However, there is also a need to maintain the performance of latex paints even at these lower VOC levels.

EP 1 106 660 discloses a resin composition for an aqueous paint containing different phase structure emulsion particles wherein the different phase structure emulsion particles have an outermost phase containing 1 to 20 mass by weight % of an ethylenic unsaturated monomer having at least one of a polyethylene glycol chain and a polypropylene chain:

It has been an object of the present invention to provide a resin composition for an aqueous paint for forming a coating film having excellent freezing-thawing stability and low temperature film-formability, without using a VOC as a coalescing agent and anti-freezing agent.

That is, the present invention relates to an aqueous coating composition, comprising a multi-stage polymer dispersion comprising (a) an inner phase comprising at least one latex polymer derived from at least one monomer and at least one polymerizable alkoxylated surfactant having the structure:

$$R^1-R^2$$

wherein $R^1$ is an allyl group selected from the group consisting of $CH_3-CH=CH-$ and $CH_2=CH-CH_2-$, or an acrylic group and $R^2$ is a radical comprising at least two carbon atoms and at least one oxyethylene or oxypropylene unit;

(b) an outer phase having a glass transition temperature of from 30° C. to 110° C. containing at least one ethylenic unsaturated monomer (c) at least one pigment;

(d) water; and (e) less than 3.0% by weight based on the total weight of the aqueous coating composition of anti-freeze agents.

It has been discovered that the use of certain polymerizable alkoxylated surfactants in aqueous coating compositions reduces the need to include anti-freeze agents in these compositions. In accordance with the invention, aqueous coating compositions (e.g. latex paints) including these polymerizable alkoxylated surfactants can be produced having excellent freeze-thaw stabilities with the addition of little or no anti-freeze agents. The aqueous coating compositions of the invention include less than 3.0% by weight and preferably less than 1.0% by weight of anti-freeze agents based on the total weight of the aqueous coating composition. More preferably, the aqueous coating compositions are substantially free of anti-freeze agents. Therefore, aqueous coating compositions can be produced in accordance with the invention that possess lower VOC levels than conventional aqueous coating compositions and thus that are more environmentally desirable.

The aqueous coating compositions of the invention include at least one latex polymer derived from at least one monomer and at least one polymerizable alkoxylated surfactant, at least one pigment, and water. The polymerizable alkoxylated surfactant used in the latex polymer has the structure:

$$R^1-R^2$$

wherein $R^1$ is an allyl group selected from the group consisting of $CH_3-CH=CH-$ and $CH_2=CH-CH_2-$, or an acrylic group, selected from $CH_2=CR-C(O)-$ with R=an organic group, preferably hydrogen or methyl, and $R^2$ is a radical comprising at least two carbon atoms and at least one oxyethylene or oxypropylene unit. Preferably, $R^2$ is $-C_6H_3(R^3)-(O-CH_2-CH_2)_n-R^4$, $-O-CH_2-CH(CH_2-O-C_6H_4-R^3)-(O-CH_2-CH_2)_n-R^4$, $-(O-CH_2-CH_2)_n-R^4$, $-(O-CH_2-CH(CH_3))_n-R^4$, $-(O-CH_2-CH_2)_m-(O-CH_2-CH(CH_3))_n-R^4$ or $-(O-CH_2-CH(CH_3))_m-(O-CH_2-CH_2)_n-R^4$; $R^3$ is an alkyl group; $R^4$ is hydroxy or a polar group such as sulfonate ($-SO_3M$), sulfate ($-SO_4M$), phosphonate ($-PO_3M$) or phosphate ($-PO_4M$); M is $H^+$, $Na^+$, $NH_4^+$, $K^+$ or $Li^+$ with the provision that $R^4$ cannot be ($-SO_4M$) or ($-PO_4M$) if $R^2$ is $(O-CH_2-CH(CH_3))_n-R^4$ or $-(O-CH_2-CH(CH_3))_m-(O-CH_2-CH_2)_n-R^4$; preferably $R^4$ is hydroxy or ($-PO_4M$), n is from about 5 to about 100; and m is from 0 to about 100. More preferably, $R^3$ is $C_7$-$C_{13}$ alkyl (e.g. $C_9H_{19}$) and n is from about 5 to about 40.

In a preferred embodiment of the invention the alkoxylated surfactant in the inner soft phase is a monomer expressed by the formula

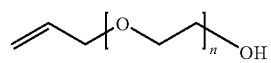

with n=6–12 or a monomer expressed by the formula

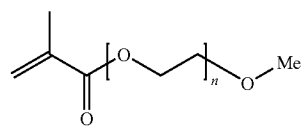

with n=5–10.

In a preferred embodiment of the invention, the at least one pigment includes at least one pigment selected from the group consisting of $TiO_2$, $CaCO_3$, clay, aluminum oxide, silicon dioxide, magnesium oxide, sodium oxide, potassium oxide, talc, barytes, zinc oxide, zinc sulfite and mixtures thereof. More preferably, the at least one pigment includes $TiO_2$, calcium carbonate or clay.

The latex polymer in the aqueous coating composition can be a pure acrylic, a styrene acrylic, a vinyl acrylic or an acrylated ethylene vinyl acetate copolymer and is more preferably a pure acrylic.

The latex polymer is preferably derived from at least one acrylic monomer selected from the group consisting of acrylic acid, acrylic acid esters, methacrylic acid, and methacrylic acid esters. For example, the at least one latex polymer can be a butyl acrylate/methyl methacrylate copolymer or a 2-ethylhexyl acrylate/methyl methacrylate copolymer.

The at least one ethylenic unsaturated monomer forming the outer phase having a glass transition temperature of from 30° C. to 110° C. can be for example styrene, vinyl acetate, methyl methacrylate, (meth)acrylic acid or acrylonitrile and can be further derived from one or more monomers selected from the group consisting of acrylonitrile, methacrylonitrile, ureido methacrylate, itaconic acid, crotonic acid, maleic acid, fumaric acid or acetylacetoxyethyl methacrylate.

Typically, the at least one latex polymer is further derived from one or more monomers selected from the group consisting of styrene, α-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, ethylene, and $C_4$-$C_8$ conjugated dienes. In addition to the above components, the aqueous coating composition can include one or more additives selected from the group consisting of dispersants, surfactants, rheology modifiers, defoamers, thickeners, biocides, mildewcides, colorants, waxes, perfumes and co-solvents.

The aqueous coating composition can further comprise 0 to 30% of a solvent. Typically, the solvents used are common organic or inorganic solvents.

The present invention further includes a method of preparing an aqueous coating composition, comprising the step of preparing the polymer latex binder using emulsion polymerization by feeding monomers to a reactor in the presence of at least one initiator and the at least one polymerizable surfactant as described above and polymerizing the monomers and the polymerizable surfactant to produce the latex binder. The at least one pigment and other additives can then be mixed with the resulting latex binder to produce the aqueous coating composition. The step of preparing the polymer latex binder can include preparing an initiator solution comprising the initiator, preparing a monomer pre-emulsion comprising monomers and the polymerizable alkoxylated surfactant of the present invention, adding the initiator solution to a reactor, and adding the monomer pre-emulsion to the reactor. The incorporation of the polymerizable alkoxylated surfactants in the polymer latex enables the coating composition to have a lower VOC content while maintaining the freeze-thaw stability of the aqueous coating composition at desirable levels.

These and other features and advantages of the present invention will become more readily apparent to those skilled in the art upon consideration of the following detailed description, which describe both the preferred and alternative embodiments of the present invention.

In the following detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

The present invention is an aqueous coating composition having a low-VOC content but that has excellent freeze-thaw stability comparable to conventional aqueous coating compositions. The aqueous coating composition of the invention includes a latex polymer derived from at least one monomer and at least one polymerizable alkoxylated surfactant, at least one pigment and water.

The latex polymer used in the aqueous coating composition is preferably derived from monomers comprising at least one acrylic monomer selected from the group consisting of acrylic acid, acrylic acid esters, methacrylic acid, and methacrylic acid esters. In addition, the latex polymer can optionally include one or more monomers selected from the group consisting of styrene; α-methyl styrene, vinyl chloride, acrylonitrile, methacrylonitrile, ureido methacrylate, acetylacetoxy ethylmethacrylate vinyl acetate, vinyl esters of branched tertiary monocarboxylic acids (e.g. vinyl esters commercially available under the mark VEOVA® from Shell Chemical Company or sold as EXXAR® Neo Vinyl Esters by ExxonMobil Chemical Company), itaconic acid, crotonic acid, maleic acid, fumaric acid, and ethylene. It is also possible to include $C_4$-$C_8$ conjugated dienes such as 1,3-butadiene, isoprene and chloroprene. Preferably, the monomers include one or more monomers selected from the group consisting of n-butyl acrylate, methyl methacrylate, styrene and 2-ethylhexyl acrylate. The latex polymer is typically selected from the group consisting of pure acrylics (comprising acrylic acid, methacrylic acid, an acrylate ester, and/or a methacrylate ester as the main monomers); styrene acrylics (comprising styrene and acrylic acid, methacrylic acid, an acrylate ester, and/or a methacrylate ester as the main monomers); vinyl acrylics (comprising vinyl acetate and acrylic acid, methacrylic acid, an acrylate ester, and/or a methacrylate ester as the main monomers); and acrylated ethylene vinyl acetate copolymers (comprising ethylene, vinyl acetate and acrylic acid, methacrylic acid, an acrylate ester, and/or a methacrylate ester as the main monomers). The monomers can also include other main monomers such as acrylamide and acrylonitrile, and one or more functional monomers such as itaconic acid, acetyl acetoxy ethyl methacrylate and ureido methacrylate, as would be readily understood by those skilled in the art. In a particularly preferred embodiment, the latex polymer is a pure acrylic such as a butyl acrylate/methyl methacrylate copolymer or a ethylhexyl acrylate/methyl methacrylate copolymer derived from monomers including butyl acrylate, ethylhexyl acrylate and methyl methacrylate. The latex polymer dispersion preferably includes from about 30 to about 75% by weight solids and a mean latex particle size of from about 70 to about 650 nm. The latex polymer is preferably present in the aqueous coating composition in an amount from about 5 to about 60 percent by weight, and more preferably from about 8 to about 40 percent by weight (i.e. the weight percentage of the dry latex polymer based on the total weight of the coating composition).

The at least one polymerizable alkoxylated surfactant used to form the polymer latex has the structure:

wherein $R^1$ is an allyl group selected from the group consisting of $CH_3$—CH=CH— and $CH_2$=CH—$CH_2$—, or an acrylic group, selected from $CH_2$=CR—C(O)— with R=an organic group, preferably hydrogen or methyl, and $R^2$ is a radical comprising at least two carbon atoms and at least one oxyethylene or oxypropylene unit. $R^2$ is —$C_6H_3(R^3)$—(O—$CH_2$—$CH_2)_n$—$R^4$, —O—CH$_2$—CH(CH$_2$—O—C$_6$H$_4$—R$^3$)—(O—CH$_2$—CH$_2$)$_n$—R$^4$, —(O—CH$_2$—CH$_2$)$_n$—R$^4$, —(O—CH$_2$—CH(CH$_3$))$_n$—R$^4$, —(O—CH$_2$—CH$_2$)$_m$—(O—CH$_2$—CH(CH$_3$))$_n$—R$^4$ or —(O—CH$_2$—CH(CH$_3$))$_m$—(O—CH$_2$CH$_2$)$_n$—R$^4$; R$^3$ is an alkyl group; R$^4$ is hydroxy or a polar group such as sulfonate (—SO$_3$M), sulfate (—SO$_4$M), phosphonate (—PO$_3$M) or phosphate (—PO$_4$M); M is H$^+$, Na$^+$, NH$_4^+$, K$^+$ or Li$^+$ with the provision that R$^4$ cannot be (—SO$_4$M) or (—PO$_4$M) if R$^2$ is (O—CH$_2$—CH(CH$_3$))$_n$—R$^4$ or —(O—CH$_2$—CH(CH$_3$))$_m$—(O—CH$_2$—CH$_2$)$_n$—R$^4$; preferably R$^4$ is hydroxy or (—PO$_4$M), n is from about 5 to about 100; and m is from 0 to about 100. More preferably, R$^3$ is C$_7$-C$_{13}$ alkyl (e.g. C$_9$H$_{19}$) and n is from about 5 to about 40. The term "alkyl" as used herein includes linear and branched alkyl groups. Suitable surfactants for use in the invention include surfactants sold under the trademarks NOIGEN® RN and HITENOL® BC and are commercially available from Montello, Inc or the PLURIOL® A . . . R(E) grades from BASF AG, Bisomer® MPEG 350 MA, Laporte. For example, PLURIOL® A10R or Bisomer® MPEG 350 MA can be used in the invention. The surfactant is typically present in the aqueous polymer dispersion in an amount from greater than 0 to about 5% by weight based on polymer weight, more preferably from about 0.5 to about 3% by weight based on polymer weight.

As mentioned above, the aqueous coating composition includes at least one pigment. The term "pigment" as used herein includes non-film-forming solids such as pigments, extenders, and fillers. The at least one pigment is preferably selected from the group consisting of TiO$_2$ (in both anastase and rutile forms), clay (aluminum silicate), CaCO$_3$ (in both ground and precipitated forms), aluminum oxide, silicon dioxide, magnesium oxide, talc (magnesium silicate), barytes (barium sulfate), zinc oxide, zinc sulfite, sodium oxide, potassium oxide and mixtures thereof. Suitable mixtures include blends of metal oxides such as those sold under the marks MINEX® (oxides of silicon, aluminum, sodium and potassium commercially available from Unimin Specialty Minerals), CELITES® (aluminum oxide and silicon dioxide commercially available from Celite Company), ATOMITES® (commercially available from English China Clay International), and ATTAGELS® (commercially available from Engelhard). More preferably, the at least one pigment includes TiO$_2$, CaCO$_3$ or clay. Generally, the mean particle sizes of the pigments range from about 0.01 to about 50 microns. For example, the TiO$_2$ particles used in the aqueous coating composition typically have a mean particle size of from about 0.15 to about 0.40 microns. The pigment can be added to the aqueous coating composition as a powder or in slurry form. The pigment is preferably present In the aqueous coating composition in an amount from about 5 to about 50 percent by weight, more preferably from about 10 to about 40 percent by weight.

The coating composition can optionally contain additives such as one or more film-forming aids or coalescing agents. Suitable firm-forming aids or coalescing agents include plasticizers and drying retarders such as high boiling point polar solvents. Other conventional coating additives such as, for example, dispersants, additional surfactants (i.e. wetting agents), rheology modifiers, defoamers, thickeners, biocides, mildewcides, colorants such as colored pigments and dyes, waxes, perfumes, co-solvents, and the like, can also be used in accordance with the invention. For example, non-ionic and/or ionic (e.g. anionic or cationic) surfactants can be used to produce the polymer latex. These additives are typically present in the aqueous coating composition in an amount from 0 to about 15% by weight, more preferably from about 1 to about 10% by weight based on the total weight of the coating composition.

As mentioned above, the aqueous coating composition includes less than 3.0% by weight of anti-freeze agents based on the total weight of the aqueous coating composition. Exemplary anti-freeze agents include ethylene glycol, diethylene glycol, propylene glycol, glycerol (1,2,3-trihydroxypropane), ethanol, methanol, 1-methoxy-2-propanol, 2-amino-2-methyl-1-propanol, and FTS-365 (a freeze-thaw stabilizer from Inovachem Specialty Chemicals). More preferably, the aqueous coating composition includes less than 1.0% by weight or is substantially free (e.g. includes less than 0.1% by weight) of anti-freeze agents. Accordingly, the aqueous coating composition of the invention preferably has a VOC level of less than about 100 g/L and more preferably less than or equal to about 50 g/L. Despite the fact that the aqueous coating compositions of the invention include little or no anti-freeze agents, the compositions possess freeze-thaw stabilities at levels desirable in the art. For example, the aqueous coating compositions of the invention can be subjected to freeze-thaw cycles using ASTM method D2243-82 without coagulation. The aqueous coating compositions can also pass a draw-down test performed by the method discussed below. Furthermore, the aqueous coating compositions of the invention exhibit good heat storage stability and exhibit Stormer viscosity increases of less than 15 KU, more preferably of 10 KU or lower, after being stored for 14 days at 50° C. by the method discussed below.

The balance of the aqueous coating composition of the invention is water. Although much of the water is present in the polymer latex dispersion and in other components of the aqueous coating composition, water is generally also added separately to the aqueous coating composition. Typically, the aqueous coating composition includes from about 10% to about 85% by weight and more preferably from about 35% to about 80% by weight water. Stated differently, the total solids content of the aqueous coating composition is typically from about 15% to about 90% by weight, more preferably from about 20% to about 65%.

The coating compositions are typically formulated such that the dried coatings comprise at least 10% by volume of dry polymer solids, and additionally 5 to 90% by volume of non-polymeric solids in the form of pigments. The dried coatings can also include additives such as plasticizers, dispersants, surfactants, rheology modifiers, defoamers, thickeners, biocides, mildewcides, colorants, waxes, and the like, that do not evaporate upon drying of the coating composition.

In one preferred embodiment of the invention, the aqueous coating composition is a latex paint composition comprising a latex polymer derived from at least one acrylic monomer selected from the group consisting of acrylic acid, acrylic acid esters, methacrylic acid, and methacrylic acid esters and at least one polymerizable alkoxylated surfactant; at least one pigment and water. As mentioned above, the at least one latex polymer can be a pure acrylic, a styrene acrylic, a vinyl acrylic or an acrylated ethylene vinyl acetate copolymer.

The present invention further includes a method of preparing an aqueous coating composition by mixing together a latex polymer derived from at least one monomer and at least one polymerizable alkoxylated surfactant as described above, and at least one pigment. Preferably, the latex polymer is in the form of a latex polymer dispersion. The additives discussed above can be added in any suitable order to the latex polymer, the pigment, or combinations thereof, to provide these additives in the aqueous coating composition. In the case of paint formulations, the aqueous coating composition preferably has a pH of from 7 to 10.

The latex polymer including the polymerizable alkoxylated surfactants of the invention can be used in combination with other ionic or non-ionic type of surfactants that are either polymerizable or non-polymerizable, in the aqueous coating composition. In particular, the polymer latex binder can be prepared using emulsion polymerization by feeding the monomers used to form the latex binder to a reactor in the presence of at least one initiator and the at least one polymerizable alkoxylated surfactant of the invention and polymerizing the monomers to produce the latex binder. The monomers fed to a reactor to prepare the polymer latex binder preferably include at least one acrylic monomer selected from the group consisting of acrylic acid, acrylic acid esters, methacrylic acid, and methacrylic acid esters. In addition, the monomers can include styrene, vinyl acetate, or ethylene. The monomers can also include one or more monomers selected from the group consisting of styrene, α-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, and ethylene. It is also possible to include C4-C8 conjugated dienes such as 1,3-butadiene, isoprene or chloroprene. Preferably, the monomers include one or more monomers selected from the group consisting of n-butyl acrylate, methyl methacrylate, styrene and 2-ethylhexyl acrylate. The initiator can be any initiator known in the art for use in emulsion polymerization such as ammonium, sodium or potassium persulfate, or a redox system that typically includes an oxidant and a reducing agent. Commonly used redox initiation systems are described e.g., by A. S. Sarac in Progress in Polymer Science 24(1999), 1149-1204.

The polymer latex binder can be produced by first preparing an initiator solution comprising the initiator and water. A monomer pre-emulsion is also prepared comprising at least a portion of the monomers to be used to form the latex polymer, one or more surfactants, water, and additional additives such as NaOH. The one or more surfactants in the monomer pre-emulsion include the polymerizable alkoxylated surfactant of the invention. The initiator solution and monomer pre-emulsion are then continuously added to the reactor over a predetermined period of time (e.g. 1.5-5 hours) to cause polymerization of the monomers and to thereby produce the latex polymer. Preferably, at least a portion of the initiator solution is added to the reactor prior to adding the monomer pre-emulsion. Prior to the addition of the initiator solution and the monomer pre-emulsion, a seed latex such as a polystyrene seed latex can be added to the reactor. The seed latex is used to obtain a uniform particle size distribution and does not influence the freeze-thaw stability of the paint. In addition, water, one or more surfactants, and any monomers not provided in the monomer pre-emulsion can be added to the reactor prior to adding the initiator and adding the monomer pre-emulsion. The reactor is operated at an elevated temperature at least until all the monomers are fed to produce the polymer latex binder. Once the polymer latex binder is prepared, it is preferably chemically stripped thereby decreasing its residual monomer content. Preferably, it is chemically stripped by continuously adding an oxidant such as a peroxide (e.g. t-butylhydro-peroxide) and a reducing agent (e.g. sodium acetone bisulfite), or another redox pair such as those described by A. S. Sarac in Progress in Polymer Science 24(1999), 1149-1204, to the latex binder at an elevated temperature and for a predetermined period of time (e.g. 0.5 hours). The pH of the latex binder can then be adjusted and a biocide or other additives added after the chemical stripping step.

The aqueous coating composition is a stable fluid that can be applied to a wide variety of materials such as, for example, paper, wood, concrete, metal, glass, ceramics, plastics, plaster, and roofing substrates such as asphaltic coatings, roofing felts, foamed polyurethane insulation; or to previously painted, primed, undercoated, worn, or weathered substrates. The aqueous coating composition of the invention can be applied to the materials by a variety of techniques well known in the art such as, for example, brush, rollers, mops, air-assisted or airless spray, electrostatic spray, and the like.

The present invention will now be further described by the following non-limiting examples.

Test Methods

Stormer Viscosity (in KU, Krebs Units): The Stormer viscosity was measured according to ASTM D 562-81.

ICI Viscosity (in Poise): The high shear ICI viscosity was measured according to ASTM D 4287-94.

Heat Storage Stability: The heat storage stability of the paints was tested by measuring the Stormer viscosity (KU) increase after storing the paints in an 8 oz. glass jar for 14 days in a drying oven at 50° C.

Freeze-Thaw Stability: The high freeze-thaw stability of the paints was tested according to ASTM D 2243-82. The freezer temperature was set at −18° C. Stormer viscosities were measured after each freeze-thaw cycle, if the paint did not coagulate.

Draw-Down of Films: After the third freeze-thaw cycle, a draw-down of the paint was made on white sealed paper (Plain Leneta white paper chart) with a 7 mil (about 180 μm thickness) blade. A pass or failure note was given based on the grit level in the dried paint film. A paint film with no or sporadic microcoagulum was rated a "pass" and a paint film with a large amount of coagulum was rated a "fail". The rating gives information on freeze-thaw stability of the paint to supplement the Stormer viscosity measurement.

EXAMPLE 1a

Example 1a illustrates the preparation of a 2-stage polymer dispersion containing 1.5% (weight percent of active material based an dry polymer weight) PLURIOL A10R (commercially available from BASF AG) in the inner soft Phase. PLURIOL A10R has the following structure:

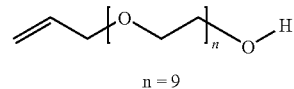

n = 9

A first monomer pre-emulsion was prepared by emulsifying 208 parts water, 21.0 parts DISPONIL FES 77 surfactant (sodium sulfate of C12-14-alkyl ethoxylate with 30 EO units, commercially available from Cognis, 30% aqueous solution), 28.0 parts of Steinapol NLS surfactant (sodium dodecylsulfate, commercially available from Cognis, 15% aqueous solution), 9.0 parts Pluriol A 10R, 6.0 parts acrylic acid, 3.0 parts itaconic acid, 45.0 parts Mhoromer 6844-0 (N-(-2-Methacryloyloxy-ethyl)ethylene urea, 25% in MMA from Roehm, Darmstadt, Germany), 141 parts methyl methacrylate and 333 parts n-butyl acrylate. The initiator solution was prepared by dissolving 1.2 parts ammonium persulfate in 22.8 parts water. A 2-liter stirred glass reactor filled with 240 parts deionized water, 3.0 parts of DISPONIL FES 77 and 4.0 parts of Steinapol NLS was purged with nitrogen and heated to 85° C. When the temperature was reached, 10% of the first monomer pre-emulsion and 5% of the initiator solution were added. After 15 minutes, the remaining initiator solution was continuously fed into the reactor over 3 hours and the rest of the first pre-emulsion was continuously fed over 2.5 hours. Immediately after the first monomer pre-emulsion a second one was continuously added to the reactor over 30 minutes.

The second monomer preemulsion was prepared by emulsifying 42.6 parts water, 6.0 parts DISPONIL FES 77 surfactant, 8.0 parts of Steinapol NLS and 72 parts methyl methacrylate. After addition of the second pre-emulsion feed, 29 parts water were added and the reaction was allowed to continue for another 30 minutes.

To further reduce the residual monomer level, a chemical stripping step was conducted. 6.0 parts of t-butylhydroperoxide solution (tBHP, 10% in water) and 5.5 parts of sodium acetone bisulfite solution (SABS) were fed synchronously to the reactor over 60 minutes. After cooling down to room temperature, the pH of the latex was adjusted to 7.5-8.5 with 6.0 parts of concentrated ammonia and 2.0 parts of Acticide MV biocide (1:3 mixture of methylisothiazolinone and chloromethylisothiazolinone, commercially available from Thor GmbH, Speyer, 1.5% aqueous solution) were added. The resulting polymer dispersion had a solids content of 50.5% and a diameter of 148 nm by photocorrelation spectroscopy.

EXAMPLE 1b

Example 1b illustrates the preparation of a 2-stage polymer dispersion containing 1.5% (weight percent of active material based an dry polymer weight) BISOMER MPEG 350 MA (commercially available from Laporte) in the inner soft phase. BISOMER MPEG 350 MA has the following structure:

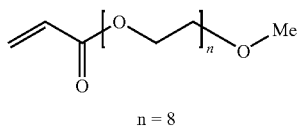

n = 8

The ingredients and process used for synthesis were the Same as used in Example 1a except that BISOMER MPEG 350 MA was used instead of PLURIOL A10R. The resulting polymer dispersion had a solids content of 50.7% and a diameter of 140 nm by photocorrelation spectroscopy.

COMPARATIVE EXAMPLE 1a

Comparative Example 1a illustrates the preparation of a 2-stage polymer dispersion without PLURIOL A10R. The ingredients and process used for synthesis were the same as used in Example 1a except that no PLURIOL A10R was used. The resulting polymer dispersion had a solids content of 50.3% and a diameter of 145 nm by photocorrelation spectroscopy.

COMPARATIVE EXAMPLE 1b

Comparative Example 1b illustrates the preparation of a 2-stage polymer dispersion containing 1.5% (weight percent of active material based an dry polymer weight) PLURIOL A10R in the outer hard phase. The ingredients and process used for synthesis were the same as used in Example 1a except that no PLURIOL A10R was in the first monomer pre-emulsion and 9.0 parts PLURIOL A10R were in the second monomer pre-emulsion. The resulting polymer dispersion had a solids content of 50.5% and a diameter of 144 nm by photocorrelation spectroscopy.

COMPARATIVE EXAMPLE 1c

Comparative Example 1c illustrates the preparation of a 2-stage polymer dispersion containing 1.5% (weight percent of active material based an dry polymer weight) PLURIOL A10R in the outer soft phase. The ingredients and process used for synthesis were the same as used in Example 1a except that the first and the second monomer pre-emulsion were exchanged. Thus, an hard inner phase and a soft outer phase was provided. The resulting polymer dispersion had a solids content of 50.5% and a diameter of 128 nm by photocorrelation spectroscopy.

Paint Formulation

The following flat paint formulation with a total VOC level of 0 g/l was used for evaluating paint performance:

| Ingredients | Parts by Weight |
| --- | --- |
| Water | 66.5 |
| Natrosol ® 250 HR[1] | 0.9 |
| Tetrapotassiumpyrophosphate | 1.0 |
| Proxel ® D 20[2] | 1.6 |
| Tamol ® 731[3] | 3.8 |
| Drewplus ® 475[4] | 2.2 |
| Minex ® 4[5] | 86.7 |
| Omyacarb ® 10[6] | 30.7 |
| Ti-Pure R 941[7] | 206.7 |
| Diafil[8] | 8.7 |
| Dispersion (50.3%-50.7%) | 242.7-244.6 |
| Acrysol ® RM 2020[9] | 11.0 |
| Drewplus ® L 475 | 1.1 |
| Nuocide ® 40-D [404-D][10] | 3.8 |
| Water | 30.8-32.7 |

[1]Hydroxyethylcellulose based thickener from Hercules Inc.
[2]Biocide base an Benzisothiazolinone from Avecia GmbH, Frankfurt
[3]BK Ladenburg, Ladenburg, Germany
[4]Sodium salt of a carboxylated polyelectrolyte, 25% solution in water, for use as dispersant from Rohm&Haas Co. Philadelphia, Pa, USA
[5]Defoamer from Ashland Chemical Co., Drew Industrial Division, Boonton, NJ, USA
[6]Calciumcarbonate filler, typical particle size 12 gm, Omya AG, Oftringen, Switzerland
[7]Titaniumdioxide slurry, 64.5% solids content, DuPont, Wilmington, De, USA
[8]Diatomeous earth filler from CR Minerals Co., Golden, Co, USA
[9]Polyurethanethickener, 20% solids content, from Rohm&Haas Co. Philadelphia, Pa, USA
[10]Biocide from Creanova, Piscataway, NJ, USA

TABLE 1

| | Example 1a | Example 1b | Comparative Example 1a | Comparative Example 1b | Comparative Example 1c |
| --- | --- | --- | --- | --- | --- |
| Stormer Viscosity (KU) | 89 | 90 | 94 | 93 | 94 |
| ICI Viscosity (poise) | 1.1 | 1.1 | 1.1 | 1.1 | 1.2 |
| Freeze-Thaw Stability (KU after 1, 2, 3, 4, 5 freeze-thaw cycles) | 111/122/>140/>140/>140 | 109/116/127/130/>140 | Fail after 1st cycle | Fail after 2nd cycle | Fail after 1st cycle |

EXAMPLE 2

Example 2 illustrates the preparation of a 2-stage polymer dispersion containing 3.0% 20 (weight percent of active material based an dry polymer weight) PLURIOL A10R (commercially available from BASF AG) in the soft phase. PLURIOL A10R has the following structure:

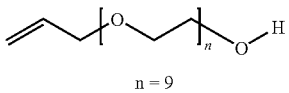

n = 9

A first monomer pre-emulsion was prepared by emulsifying 570 parts water, 60.0 parts DISPONIL FES 77 surfactant (sodium sulfate of $C_{12}$-$C_{14}$-alkyl ethoxylate with 30 EO units, commercially available from Cognis, 30% aqueous solution), 26.7 parts of DOWFAX 2A1 surfactant (disodium disulfonate of $C_{12}$-alkyl diphenyl ether, commercially available from Dow, 45% aqueous solution), 45.0 parts Pluriol A10R, 15.0 parts vinyl acetate, 15.0 parts acrylic acid, 7.5 parts itaconic acid, 112.5 parts Mhoromer 6844-0 (N-(-2-Methacryloyloxyethyl)ethylene urea, 25% in MMA from Roehm, Darmstadt, Germany), 465 parts methyl methacrylate and 705 parts 2-ethylhexyl acrylate. The Initiator solution was prepared by dissolving 3.0 parts ammonium persulfate in 57 parts water. A 4-liter stirred glass reactor filled with 575 parts deionized water and 72.7 parts of a 33% polystyrene seed latex was purged with nitrogen and heated to 85° C. When the temperature was reached, 5% of the initiator solution was added. After 5 minutes, the remaining initiator solution was continuously fed into the reactor over 3 hours and the rest of the first pre-emulsion was continuously fed over 2.5 hours. Immediately after the first monomer pre-emulsion a second one was continuously added to the reactor over 30 minutes. The second monomer preemulsion was prepared by emulsifying 120 parts water, 15.0 parts DISPONIL FES 77 surfactant, 6.7 parts of DOWFAX 2A1 surfactant and 180 parts methyl methacrylate. After addition of the second pre-emulsion feed, 73 parts water were added and the reaction was allowed to continue for another 30 minutes with addition of 55.6 parts of DEXTROL OC-11 PG emulsifier (sodium salt of phosphate ester of nonyl phenol ethoxylate, commercially available from Dexter Chemical, Bronx, 27% aqueous solution) after 15 minutes.

To further reduce the residual monomer level, a chemical stripping step was conducted. 15 parts of t-butylhydroperoxide solution (tBHP, 10% in water) and 13.7 parts of sodium acetone bisulfite solution (SABS) were fed synchronously to the reactor over 60 minutes. After cooling down to room temperature, the pH of the latex was adjusted to 7.5-8.5 with 18.0 parts of concentrated ammonia and 5.0 parts of Acticid MV biocide were added. The resulting polymer dispersion had a solids content of 50.3% and a diameter of 140 nm by photocorrelation spectroscopy.

COMPARATIVE EXAMPLE 2

Comparative Example 2 illustrates the preparation of a polymer dispersion without PLURIOL A10R. The ingredients and process used for synthesis were the same as used in Example 2 except that no PLURIOL A10R and no vinyl acetate was used. The resulting polymer dispersion had a solids content of 50.5% and a diameter of 142 nm by photocorrelation spectroscopy.

Paint Formulation

The following flat paint formulation with a total VOC level of 50 g/l was used for evaluating paint performance:

| Ingredients | Parts by Weight |
|---|---|
| Water | 15.7 |
| Propylene glycol | 9.1 |
| Proxel ® GXL[1] | 2.2 |
| Tamol ® 165[2] | 4.5 |
| Kronos ® 4310 slurry[3] | 193.6 |
| Agitan ® E 255[4] | 3.0 |
| Acrysol ® RM 2020 | 9.5 |
| Water | 35.4 |
| Dispersion (50.3%-50.7%) | 326.0-326.6 |
| Ropaque ® OP-96[5] | 34.8 |
| Agitan ® 255[4] | 1.5 |
| Acrysol ® RM 2020 | 10.0 |
| Polyphase ® -20 T[6] | 6.0 |
| Water | 47.9-48.5 |

The ingredients were added with stirring in the order given in the formulation.
[1]Biocide base an Benzisothiazolinone from Avecia GmbH, Frankfurt
[2]Dispersant, 21.5% solids content, from Rohm&Haas Co. Philadelphia, Pa, USA
[3]Titaniumdioxide slurry, 76.5% solids content, Kronos Inc., USA
[4]Defoamer from Muenzing GmbH, Heilbronn
[5]37.5% polymer dispersion (non film forming) from Rohm&Haas Co. Philadelphia, Pa, USA
[6]Fungicide, 20% solution of iodopropinylbutylcarbamate from Troy Corp., USA

TABLE 2

| | Results | |
|---|---|---|
| | Example 2 | Comparative Example 2 |
| Stormer Viscosity (KU) | 69 | 79 |
| ICI Viscosity (poise) | 1.0 | 1.0 |
| Freeze-thaw Stability (KU after 1, 2, 3, 4, 5 freeze-thaw cycles) | 71/76/80/82/79 | 96/100/105/108/103 |

The test results in Table 1 show that the functional comonomers of the present invention improve the freeze-thaw stability of the paints in which they are used compared to paints at equivalent VOC levels using none of them (Table 2). As can be seen from the Comparative Examples, it is of utmost importance that the functional comonomer is placed in the soft phase and the hard phase constitutes the outer phase. Additionally, freeze-thaw stability may be further enhanced by employing EHA as soft monomer. Accordingly, the amount of ant-freeze agents used in the latex paints can be reduced when the functional comonomers of the invention are used in the manufacture of these paints without sacrificing the freeze-thaw stability of these paints. Furthermore, the comonomers of the invention allow latex paints to be produced with the above-described properties at low or zero-VOC levels. Therefore, the latex paints produced according to the invention are more environmentally safe than conventional paints.

The invention claimed is:

1. An aqueous coating composition, comprising a multi-stage polymer dispersion comprising
   a) an inner phase comprising at least one latex polymer derived from at least one monomer and at least one polymerizable alkoxylated surfactant having the structure:

$R^1$—$R^2$ 

wherein $R^1$ is an allyl group selected from the group consisting of $CH_3$—CH=CH— and $CH_2$=CH—$CH_2$—, or an acrylic group and $R^2$ is a radical comprising at least two carbon atoms and at least one oxyethylene or oxypropylene unit;
  (b) an outer phase having a glass transition temperature of from 30° C. to 110° C. containing at least one ethylenic unsaturated monomer;
  (c) at least one pigment;
  (d) water; and
  (e) less than 3.0% by weight based on the total weight of the aqueous coating composition of anti-freeze agents.

2. The composition according to claim 1, comprising less than 1.0% by weight based on the total weight of the aqueous coating composition of anti-freeze agents.

3. The composition according to claim 1, being substantially free of anti-freeze agents.

4. The composition according to claim 1, wherein $R^2$—$C_6H_3(R^3)$—$(O$—$CH_2$—$CH_2)_n$—$R^4$, $O$—$CH_2$—$CH(CH_2$—$O$—$C_6H_4$—$R^3)$—$(O$—$CH_2$—$CH_2)_n$—$R^4$, —$(O$—$CH_2$—$CH_2)_n$—$R^4$, —$(O$—$CH_2$—$CH(CH_3))_n$—$R^4$, —$(O$—$CH_2$—$CH_2)_m$—$(O$—$CH_2$—$CH(CH_3))_n$—$R^4$ or —$(O$—$CH_2$—$CH(CH_3))_m$—$(O$—$CH_2$—$CH_2)_n$—$R^4$; $R^3$ is an alkyl group; $R^4$ is hydroxy or a polar group with the provision that $R^4$ cannot be (—$SO_4M$) or (—$PO_4M$) if $R^2$ is ($O$—$CH_2$—$CH(CH_3))_n$—$R^4$ or —$(O$—$CH_2$—$CH(CH_3))_m$—$(O$—$CH_2$—$CH_2)_n$—$R^4$; n is from about 5 to about 100; and m is from 0 to about 100.

5. The composition according to claim 4, wherein n is from about 5 to about 40.

6. The composition according to claim 1, wherein the alkoxylated surfactant in the inner soft phase is a monomer expressed by the formula

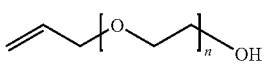

with n=6–12.

7. The composition according to claim 1, wherein the alkoxylated surfactant in the inner soft phase is a monomer expressed by the formula

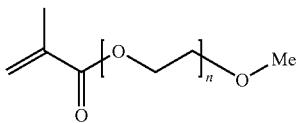

With n=5–10.

8. The composition according to claim 1, further comprising up to 30% of a solvent.

9. The composition according to claim 1, wherein the at least one pigment includes at least one pigment selected from the group consisting of $TiO_2$, clay, $CaCO_3$, aluminium oxide, silicon dioxide, magnesium oxide, talc (magnesium silicate), barytes (barium sulfate), zinc oxide, zinc sulfite, sodium oxide, potassium oxide and mixtures thereof.

10. The composition according to claim 1, wherein the at least one pigment includes $TiO_2$, calcium carbonate or clay.

11. The composition according to claim 1, wherein the inorganic pigment includes $TiO_2$.

12. The composition according to claim 1, wherein the latex polymer is selected from the group consisting of pure acrylics, styrene acrylics, vinyl acrylics and acrylated ethylene vinyl acetate copolymers.

13. The composition according to claim 1, wherein the latex polymer includes a pure acrylic.

14. The composition according to claim 1, wherein the latex polymer is derived from at least one acrylic monomer selected from the group consisting of acrylic acid, acrylic acid esters, methacrylic acid, and methacrylic acid esters.

15. The composition according to claim 1, wherein the latex polymer is further derived from one or more monomers selected from the group consisting of styrene, α-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, acetyl acetoxy ethyl methacrylate, ethylene, and $C_4$-$C_8$ conjugated dienes.

16. The composition according to claim 1, further comprising one or more additives selected from the group consisting of dispersants, surfactants, rheology modifiers, defoamers, thickeners, biocides, mildewcides, colorants, waxes, perfumes and co-solvents.

17. A latex paint composition comprising a multi-stage polymer dispersion comprising
  (a) an inner phase comprising at least one latex polymer derived from at least one monomer and at least one polymerizable alkoxylated surfactant having the structure:
wherein $R^1$ is an allyl group selected from the group consisting of $CH_3$—$CH$=$CH$— and $CH_2$=$CH$—$CH_2$—, or an acrylic group and $R^2$ is a radical comprising at least two carbon atoms and at least one oxyethylene or oxypropylene unit;
  (b) an outer phase having a glass transition temperature of from 30° C. to 110° C. containing at least one ethylenic unsaturated monomer;
  (c) at least one pigment;
  (d) water; and
  (e) less than 3.0% by weight based on the total weight of the aqueous coating composition of anti-freeze agents.

* * * * *